(12) United States Patent
Anderson et al.

(10) Patent No.: US 10,260,350 B2
(45) Date of Patent: Apr. 16, 2019

(54) GAS TURBINE ENGINE AIRFOIL STRUCTURE

(71) Applicant: United Technologies Corporation, Hartford, CT (US)

(72) Inventors: Carney R. Anderson, East Haddam, CT (US); William R. Graves, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 765 days.

(21) Appl. No.: 14/831,979

(22) Filed: Aug. 21, 2015

(65) Prior Publication Data

US 2016/0069188 A1    Mar. 10, 2016

Related U.S. Application Data

(60) Provisional application No. 62/046,209, filed on Sep. 5, 2014.

(51) Int. Cl.
| F01D 5/30 | (2006.01) |
| F01D 5/14 | (2006.01) |
| F01D 21/04 | (2006.01) |

(52) U.S. Cl.
CPC .............. F01D 5/141 (2013.01); F01D 5/147 (2013.01); F01D 5/3007 (2013.01); F01D 21/045 (2013.01); *F05D 2240/80* (2013.01); *F05D 2260/94* (2013.01); *Y02T 50/673* (2013.01)

(58) Field of Classification Search
CPC .......... F01D 5/143; F01D 5/141; F01D 5/147; F01D 5/3007; F01D 21/045; F05D 2260/941; F05D 2240/80; F05D 2240/81; F05D 2260/94; F04D 29/324; F04D 29/38; F04D 29/384; F05B 2240/80; F05B 2240/81; Y02T 50/673

USPC ...................................................... 416/193 A

See application file for complete search history.

(56) References Cited

U.S. PATENT DOCUMENTS

| 2,873,088 | A | * | 2/1959 | Neumann | ............. F01D 5/3007 416/193 A |
| 4,120,607 | A | * | 10/1978 | Coplin | .................. F01D 21/045 416/193 A |
| 4,457,668 | A | * | 7/1984 | Hallinger | .................. F01D 5/26 416/190 |
| 5,193,982 | A | * | 3/1993 | Inizan | .................. F01D 11/008 416/193 A |
| 5,256,035 | A | * | 10/1993 | Norris | .................. F01D 5/3015 416/220 R |
| 5,655,883 | A | | 8/1997 | Schilling | |
| 5,785,498 | A | | 7/1998 | Quinn et al. | |
| 6,039,542 | A | | 3/2000 | Schilling et al. | |

(Continued)

OTHER PUBLICATIONS

Extended European Search Report for European Application No. 15183839.8, dated Feb. 9, 2016.

*Primary Examiner* — Logan Kraft
*Assistant Examiner* — Brian Delrue
(74) *Attorney, Agent, or Firm* — Carlson, Gaskey & Olds, P.C.

(57) ABSTRACT

An airfoil structure includes an airfoil that has a leading edge and a platform that includes a first side that is attached to the airfoil and a second side opposite the airfoil. The platform includes a relief cut on the second side of the platform axially aligned with the leading edge.

16 Claims, 2 Drawing Sheets

(56) References Cited

U.S. PATENT DOCUMENTS

| | | | |
|---|---|---|---|
| 6,082,970 A * | 7/2000 | Tsukamoto | F01D 5/24 |
| | | | 416/190 |
| 6,364,616 B1 | 4/2002 | Stevenson et al. | |
| 7,371,428 B2 * | 5/2008 | Russo | C23C 10/02 |
| | | | 427/250 |
| 7,597,536 B1 * | 10/2009 | Liang | F01D 5/147 |
| | | | 415/115 |
| 7,640,661 B2 | 1/2010 | Despreaux et al. | |
| 7,806,652 B2 | 10/2010 | Major et al. | |
| 8,256,118 B2 | 9/2012 | Cammer | |
| 8,876,479 B2 * | 11/2014 | Thomen | F01D 5/22 |
| | | | 416/190 |
| 8,951,014 B2 * | 2/2015 | Corcoran | F01D 5/22 |
| | | | 416/193 A |
| 2002/0081205 A1 * | 6/2002 | Wong | F01D 5/147 |
| | | | 416/219 R |
| 2005/0135936 A1 * | 6/2005 | Cherolis | F01D 5/141 |
| | | | 416/193 A |
| 2008/0063529 A1 * | 3/2008 | Miller | F01D 5/147 |
| | | | 416/193 A |
| 2009/0297351 A1 | 12/2009 | Brahmasuraih | |
| 2011/0211965 A1 | 9/2011 | Deal et al. | |
| 2012/0121384 A1 * | 5/2012 | Borufka | F01D 5/22 |
| | | | 415/119 |
| 2012/0251331 A1 * | 10/2012 | Dietrich | F01D 5/147 |
| | | | 416/97 R |
| 2012/0301292 A1 | 11/2012 | Deal et al. | |
| 2013/0011265 A1 * | 1/2013 | Miller | F01D 11/008 |
| | | | 416/191 |
| 2014/0079559 A1 | 3/2014 | Luczak | |
| 2014/0147283 A1 | 5/2014 | Ward, Jr. et al. | |
| 2017/0356297 A1 * | 12/2017 | Neville | F01D 5/187 |

\* cited by examiner

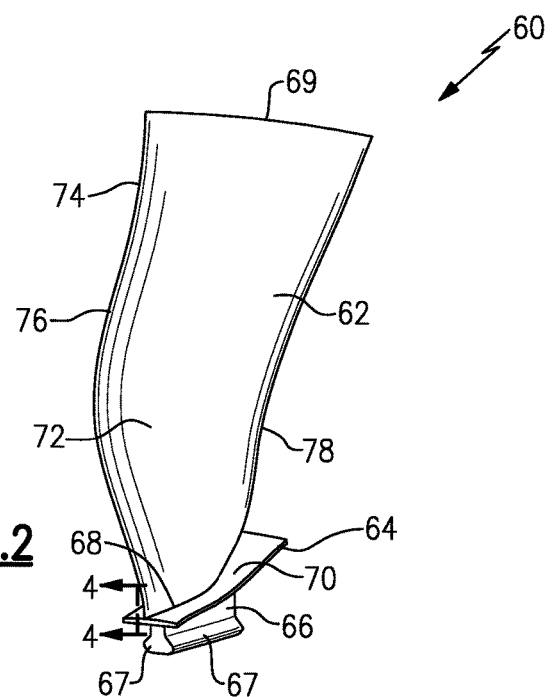
FIG.2
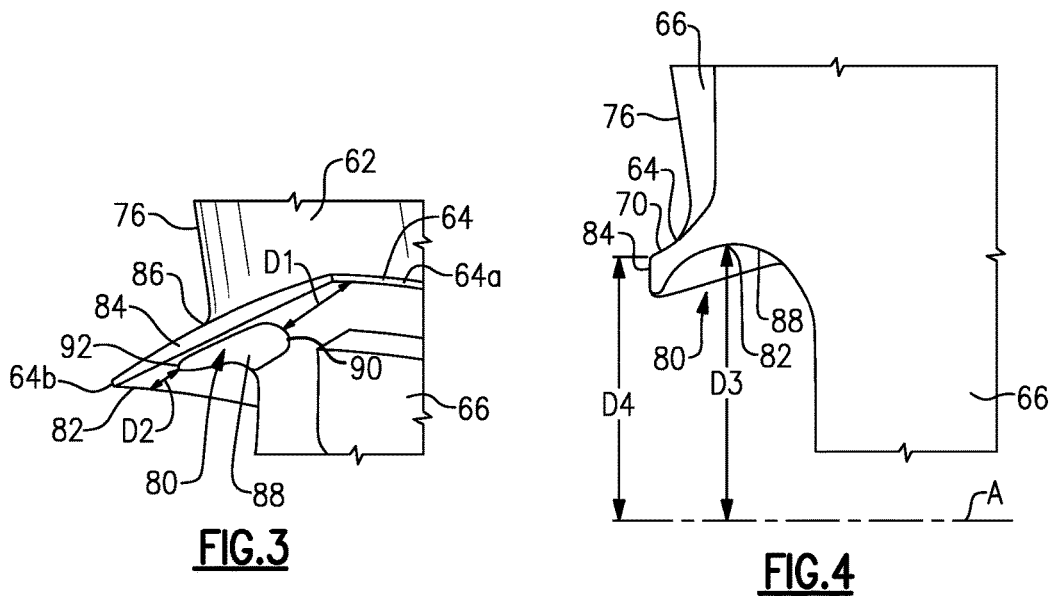
FIG.3
FIG.4

GAS TURBINE ENGINE AIRFOIL STRUCTURE

CROSS-REFERENCE TO RELATED APPLICATIONS

This application claims priority to United States Provisional Application No. 62/046,209, which was filed on Sep. 5, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Compressor blades in the gas turbine engine are the foremost rotating components of a gas turbine engine and are subject to considerable loads by centrifugal forces, gas pressure, and vibration of the airfoils stimulated by the flow medium. Additionally, compressor blades are subject to impact with foreign objects, such as from bird strikes or ice.

The compressor blades experience significant loads from the impact resulting from the ingestion of a bird or ice. Some compressor blades have a small leading edge radius that is pointed to cut through the foreign object quickly in order to reduce the impact and loading of the compressor blade. The pointed leading edges on the compressor blades are beneficial for aerodynamic purposes, but are susceptible to damage and erosion that can negatively impact aerodynamic efficiency and require maintenance more frequently. Therefore, there is a need for an airfoil structure, such as a compressor blade or a fan blade, to be able to withstand ingestion of foreign objects and yet be durable, require low maintenance, and be easy to manufacture.

SUMMARY

In one exemplary embodiment, an airfoil structure includes an airfoil that has a leading edge and a platform that includes a first side that is attached to the airfoil and a second side opposite the airfoil. The platform includes a relief cut on the second side of the platform axially aligned with the leading edge.

In a further embodiment of the above, the relief cut is axially aligned with the leading edge.

In a further embodiment of any of the above, the relief cut includes a region of reduced thickness in the platform spaced downstream of a leading edge of the platform.

In a further embodiment of any of the above, the platform includes an overhang at a leading edge and the area of reduced thickness is located in the overhang.

In a further embodiment of any of the above, the relief cut is spaced inward from a perimeter of the platform.

In a further embodiment of any of the above, the relief cut forms a relief surface with a radially outer portion spaced radially outward from a portion of the first side of the platform.

In a further embodiment of any of the above, the portion of the first side of the platform is located at a leading edge of the platform.

In a further embodiment of any of the above, a root extends from the second side of the platform. The relief cut extends into a portion of the root.

In a further embodiment of any of the above, the relief cut extends in a direction generally transverse to the airfoil.

In a further embodiment of any of the above, the relief cut is non-symmetric relative to a leading edge of the platform.

In another exemplary embodiment, a gas turbine engine section includes a rotor that is configured to rotate about an axis of rotation and an airfoil structure which includes an airfoil having a leading edge, a platform that includes a first side that is attached to the airfoil and a second side opposite the airfoil. The platform includes a relief cut on the second side of the platform axially aligned with the leading edge of the platform.

In a further embodiment of any of the above, the relief cut includes a region of reduced thickness in the platform spaced downstream of a leading edge of the platform. The relief cut is spaced inward from a perimeter of the platform.

In a further embodiment of any of the above, the platform includes a leading edge overhang and the area of reduced thickness is located in the leading edge overhang.

In a further embodiment of any of the above, the airfoil is integral with the platform and the relief cut forms a relief surface with a radially outer portion spaced radially outward from a portion of the first side of the platform.

In a further embodiment of any of the above, a root on the second side of the platform for engaging the rotor. The relief cut extends a long a portion of the root.

In another exemplary embodiment, a method of forming an airfoil structure includes locating an airfoil that has a leading edge on a first side of a platform and forming a relief cut on a second side of the platform opposite the first side of the platform axially aligned with the leading edge of the airfoil.

In a further embodiment of the above, the relief cut includes a region of reduced thickness in the platform spaced downstream of a leading edge of the platform. The relief cut is spaced inward from a perimeter of the platform.

In a further embodiment of any of the above, the airfoil is integral with the platform and the relief cut forms a relief surface. The relief surface includes a radially outer portion spaced radially outward from a portion of the first side of the platform.

In a further embodiment of any of the above, the relief cut is formed by at least one of a grinding, machining, or casting process.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates an example airfoil.

FIG. 3 illustrates a perspective view of the example airfoil of FIG. 2.

FIG. 4 illustrates a cross-section view taken along line 4-4 of FIG. 2.

DETAILED DESCRIPTION

Figure 1:
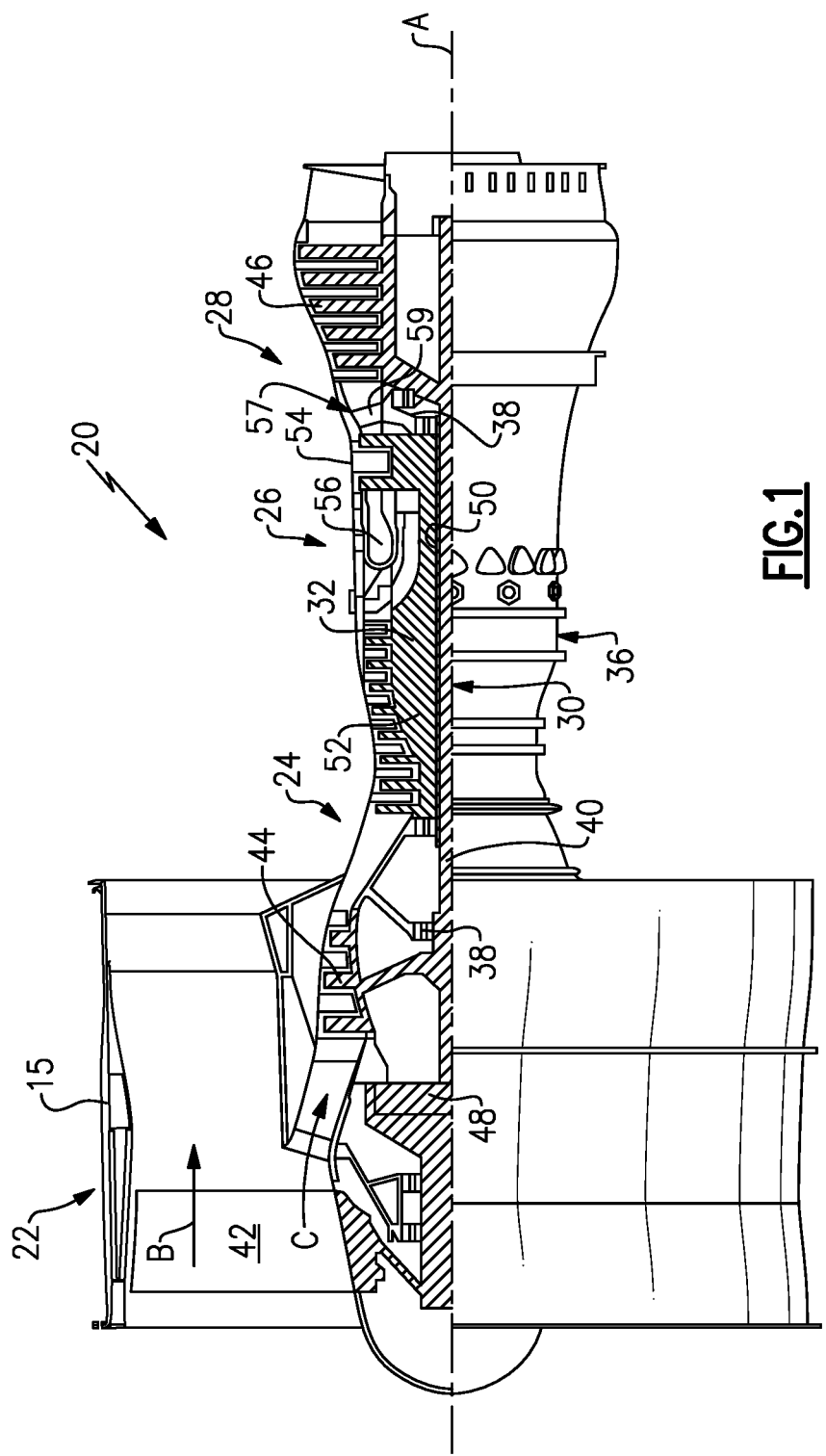
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second (350.5 meters/second).

FIG. 2 illustrates an example airfoil structure 60 including an airfoil 62, a platform 64, and optionally a root portion 66. In the illustrated example, the airfoil structure 60 is a compressor blade. However, the airfoil structure 60 could be a fan blade or a turbine blade. The airfoil structure 60 is configured to form a circumferential ring surrounding the engine axis A when jointed with additional similar airfoil structures 60. In this disclosure, circumferential or circumferentially spaced is relative to a circumference surrounding the engine axis A of the gas turbine engine 20 unless otherwise specified.

The airfoil 62 includes a pressure side 72 and a suction side 74 separated by a leading edge 76 and a trailing edge 78. The pressure side 72 of the airfoil structure 60 is generally concave and the opposing suction side 74 is generally convex. A first airfoil end 68 is rigidly attached to a radially outer side 70 of the platform 64 and a second airfoil end 69 is spaced from the platform 64 forming a free end. In one example, the leading edge 76 of the airfoil 62 includes a sharp edge configured to cut through a foreign object and is free of internal cooling passages.

In the illustrated example, the airfoil 62 is formed integral with the platform 64 such that the airfoil 62 and the platform 64 form an integral or unitary piece. In another example, the airfoil 62 and the platform 64 could be formed separately and then attached to each other. In this disclosure, radial or radial direction is relative to the engine axis A of the gas turbine engine 20 unless otherwise specified.

The radially outer side 70 of the platform 64 forms a radially inner boundary layer for fluid traveling over the airfoil structure 60. The root portion 66 extends radially inward from the platform 64 to retain the airfoil structure 60 to a compressor rotor 79 (FIG. 1). The root portion 66 is located on an opposite side of the platform 64 from the airfoil 62 on a radially inner side 82. The root portion 66 includes ribs 67 located on opposite sides of the root portion 66 for engaging complimentary shaped receptacles on the compressor rotor 79 of the gas turbine engine 20.

As shown in FIG. 3, a relief cut 80 is formed on the radially inner side 82 of the platform 64 having a relief surface 88 in the platform 64. The relief cut 80 is formed by at least one of grinding, machining, or casting process and includes a region of reduced thickness of an upstream platform overhang 86, and may be spaced downstream of a leading edge 84 of the platform 64.

In the illustrated example, the relief cut 80 is axially and circumferentially aligned with the leading edge 76 of the airfoil 62 and is spaced inward of a perimeter of the platform 64. The relief cut 80 extends from a region axially upstream of the leading edge 76 of the airfoil 62 to a region immediately downstream of the airfoil 62 and upstream of the root portion 66. The relief cut 80 is non-symmetric relative to center line of the leading edge 84 of the upstream platform overhang 86 and extends in a generally transverse direction relative to the airfoil 62.

The platform 64 includes a pressure side edge 64a and a suction side edge 64b. The relief cut 80 is spaced a distance D1 from the pressure side edge 64a and a distance D2 from the suction side edge 64b. In the illustrated example, the distance D1 is greater than the distance D2 such that the relief cut 80 is located closer to the suction side edge 64b than the pressure side edge 64a. The relief surface 88 also includes a first curved portion 90 located adjacent the pressure side edge 64a of the platform 64 and a second curved portion 92 located adjacent the suction side edge 64b of the platform 64. The first curved portion 90 is also circumferentially spaced between opposite sides of the root portion 66.

As shown in FIG. 4, the relief cut 80 includes a curvilinear profile defining the relief surface 88. A radially outermost portion of the relief surface 88 is spaced a distance D3 from the engine axis A and a portion of the radially outer side 70 of the platform along the leading edge 84 of the upstream platform overhang 86 is spaced a distance D4 from the engine axis A. In the illustrated example, the distance D3 is greater than the distance D4 and the radially outer most portion of the relief surface 88 is located in a mid-point of the relief cut 80. Additionally, the relief cut 80 may extend into the root portion 66.

When an object, such as a bird or ice, impacts the leading edge 76 of the airfoil 62, an extreme bending stress results at the first airfoil end 68 adjacent the leading edge 76 and the platform 64. The region surrounding the intersection of the leading edge 76 and the platform 64 of airfoil structure 60 is also subject to stiffness discontinuities which cause locally high strains in the material. This is particularly the case when the airfoil 62 and the platform 64 are formed as a unitary piece. The relief cut 80 reduces the stiffness discontinuities in the material and the likelihood of fracture or failure along the leading edge 76 adjacent the platform 64 by softening the material in this region and spreading the strain over a greater portion of the material downstream of the leading edge 76 of the airfoil 62.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil structure comprising:
an airfoil having a leading edge; and
a platform including a first side attached to the airfoil and a second side opposite the airfoil, wherein the platform includes a relief cut on the second side of the platform axially aligned with the leading edge, the relief cut is non-symmetric relative to a leading edge of the platform, and the relief cut is spaced inward from a perimeter of the platform with a pressure side end of the relief cut is spaced a first distance from a pressure side edge of the platform and a suction side end of the relief cut is spaced a second distance from a suction side edge of the platform and the first distance is greater than the second distance.

2. The airfoil structure of claim 1, wherein the relief cut includes a region of reduced thickness in the platform spaced downstream of a leading edge of the platform.

3. The airfoil structure of claim 2, further comprising a root portion extending from the second side of the platform having a root leading edge, wherein the platform includes an overhang at a platform leading edge and the area of reduced thickness is located in the overhang axially forward of the root leading edge.

4. The airfoil structure of claim 2, wherein the relief cut forms a relief surface and a radially outer portion of the relief surface is spaced radially outward from a portion of the first side of the platform.

5. The airfoil structure of claim 4, wherein the portion of the first side of the platform is located at a leading edge of the platform.

6. The airfoil structure of claim 1, further comprising a root extending from the second side of platform, wherein the relief cut extends into a portion of the root and a leading edge portion of the relief cut is located axially forward of a leading edge of the root.

7. The airfoil structure of claim 1, wherein the relief cut extends in a direction generally transverse to the airfoil.

8. A gas turbine engine section comprising:
a rotor configured to rotate about an axis of rotation; and
an airfoil structure including:
an airfoil having a leading edge; and
a platform including a first side attached to the airfoil and a second side opposite the airfoil, wherein the platform includes a relief cut on the second side of the platform axially aligned with the leading edge of the platform and the relief cut is spaced inward from a perimeter of the platform with a pressure side end of the relief cut is spaced a first distance from a pressure side edge of the platform and a suction side end of the relief cut is spaced a second distance from a suction side edge of the platform and the first distance is greater than the second distance.

9. The gas turbine engine section of claim 8, wherein the relief cut includes a region of reduced thickness in the platform spaced downstream of a leading edge of the platform.

10. The gas turbine engine section of claim 8, wherein the platform includes a leading edge overhang and the area of reduced thickness is located in the leading edge overhang.

11. The gas turbine engine section of claim 8, wherein the airfoil is integral with the platform and the relief cut forms a relief surface with a radially outer portion spaced radially outward from a portion of the first side of the platform.

12. The gas turbine engine section of claim 8, further comprising a root on the second side of the platform for engaging the rotor, wherein the relief cut extends a long a portion of the root.

13. A method of forming an airfoil structure comprising:
locating an airfoil having a leading edge on a first side of a platform; and
forming a relief cut on a second side of the platform opposite the first side of the platform axially aligned with the leading edge of the airfoil and the relief cut is spaced inward from a perimeter of the platform with a pressure side end of the relief cut is spaced a first distance from a pressure side edge of the platform and a suction side end of the relief cut is spaced a second distance from a suction side edge of the platform and the first distance is greater than the second distance.

14. The method of claim 13, wherein the relief cut includes a region of reduced thickness in the platform spaced downstream of a leading edge of the platform, the relief cut is spaced inward from a perimeter of the platform.

15. The method of claim 13, wherein the airfoil is integral with the platform and the relief cut forms a relief surface, the relief surface includes a radially outer portion spaced radially outward from a portion of the first side of the platform.

16. The method of claim 13, wherein the relief cut is formed by at least one of a grinding, machining, or casting process.

* * * * *